(12) United States Patent
Upson et al.

(10) Patent No.: US 9,305,333 B1
(45) Date of Patent: *Apr. 5, 2016

(54) DISPLAY WITH SQUARE ROOT OF TWO ASPECT RATIO

(71) Applicant: GOOGLE INC., Mountain View, CA (US)

(72) Inventors: Linus Upson, Woodside, CA (US); Mark Hayter, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,136

(22) Filed: Aug. 18, 2014

Related U.S. Application Data (63) Continuation of application No. 13/089,882, filed on Apr. 19, 2011, now Pat. No. 8,847,991.

(51) Int. Cl.
   G09G 5/00 (2006.01)
   G06T 3/60 (2006.01)

(52) U.S. Cl.
   CPC .......................................... *G06T 3/60* (2013.01)

(58) Field of Classification Search
   CPC ....................................................... G09G 5/00
   See application file for complete search history.

(56) References Cited

U.S. PATENT DOCUMENTS

| | | | |
|---|---|---|---|
| 5,825,427 A | 10/1998 | MacLeod | |
| 6,018,345 A | 1/2000 | Berstis | |
| 6,081,207 A | 6/2000 | Batio | |
| 7,607,710 B2 | 10/2009 | Yeo | |
| 2002/0021278 A1 | 2/2002 | Hinckley et al. | |
| 2003/0117425 A1 | 6/2003 | O'Leary et al. | |
| 2005/0156948 A1 | 7/2005 | Hunt | |
| 2008/0024388 A1 | 1/2008 | Bruce | |
| 2008/0134061 A1 | 6/2008 | Banerjee et al. | |
| 2008/0225146 A1 | 9/2008 | Maki | |
| 2010/0060664 A1 | 3/2010 | Kilpatrick, II et al. | |

OTHER PUBLICATIONS

Non-Final Office Action received for U.S. Appl. No. 13/089,882, mailed on Jul. 18, 2013, 37 pages.
Response to Non-Final Office Action for U.S. Appl. No. 13/089,882, filed Oct. 18, 2013, 16 pages.
Final Office Action received for U.S. Appl. No. 13/089,882, mailed on Dec. 30, 2013, 34 pages.
Response to Final Office Action for U.S. Appl. No. 13/089,882, filed Apr. 30, 2014, 15 pages.
Notice of Allowance received for U.S. Appl. No. 13/089,882, mailed on May 19, 2014, 11 pages.
Padova, Ted, "Adobe Acrobat 8 PDF Bible", John Wiley & Sons, Section 5.3 & Section 30, Feb. 12, 2007, 39 pages.
Micheletti, Angelo, "IPhone Photography & Video for Dummies", Wiley Publishing, Inc, Section 2.1, Oct. 12, 2010, 16 pages.

*Primary Examiner* — Sing-Wai Wu
(74) *Attorney, Agent, or Firm* — Brake Hughes Bellermann LLP (57) ABSTRACT

An apparatus may include a housing, an electronic display region, and a controller. The electronic display region may be coupled to the housing, and may have a rectangular shape with a length and a width, the length being approximately a square root of two ($\sqrt{2}$) times longer than the width. In response to an indication that the housing and the display region have been rotated from the portrait mode to a landscape mode, the controller may be configured to display a first image and a second image, the first image having an aspect ratio defined by a second length of the first image divided by a second width of the first image, wherein the second length is different from the first length, the second width is different from the first width, the second aspect ratio is substantially equal to the first aspect ratio, and the first image being rotated by ninety degrees (90°) from the first orientation with respect to the axis.

16 Claims, 4 Drawing Sheets

DISPLAY WITH SQUARE ROOT OF TWO ASPECT RATIO

CROSS-REFERENCE TO RELATED APPLICATION

This application is a Continuation of, and claims priority to, U.S. patent application Ser. No. 13/089,882, filed on Apr. 19, 2011, entitled "DISPLAY WITH SQUARE ROOT OF TWO ASPECT RATIO", the disclosure of which is incorporated by reference herein in its entirety.

TECHNICAL FIELD

This description relates to electronic displays and, in particular, to displays with a square root of two aspect ratio of their dimensions.

BACKGROUND

Electronic displays may rotate an image from a portrait view to a landscape view. However, the rotation may cause some of the image to be lost in the rotated view.

SUMMARY

According to a first general aspect, an apparatus may include a housing, an electronic display region, and a controller. The electronic display region may be coupled to the housing, and may have a rectangular shape with a length and a width, the length being approximately a square root of two ($\sqrt{2}$) times longer than the width. The controller may be configured to display a first image in the display region in a first orientation with respect to an axis of the housing, where the axis of the housing lies in a plane of the image, when the housing and the display region are oriented in a portrait mode, the first image having a first aspect ratio defined by a first length of the first image divided by a first width of the first image, and automatically display, in response to an indication that the housing and the display region have been rotated from the portrait mode to a landscape mode, the first image and a second image, the first image having a second aspect ratio defined by a second length of the first image divided by a second width of the first image, wherein the second length is different from the first length, the second width is different from the first width, the second aspect ratio is substantially equal to the first aspect ratio, and the first image being rotated by ninety degrees (90°) from the first orientation with respect to the axis.

According to another general aspect, an apparatus may include an electronic display and a controller. The electronic display may have a rectangular shape, the electronic display having a length which is approximately a square root of two ($\sqrt{2}$) times a width of the electronic display. The controller may be configured to control an image displayed by the electronic display, the controller being configured to shift the image between a portrait mode including a single first image, the single first image occupying all of the electronic display, and a landscape mode including the first image occupying a left half or a right half of the electronic display and a second image occupying an opposite half of the electronic display, wherein all of the first image which was displayed in the portrait mode is displayed in all of the first half or the second half of the electronic display and the first image maintains a same aspect ratio in the landscape mode as in the portrait mode.

According to another general aspect, an apparatus may include a first electronic display and a second electronic display. The first electronic display may have a height which is approximately a square root of two ($\sqrt{2}$) times a width of the first electronic display. The second electronic display may also have a height which is approximately the square root of two ($\sqrt{2}$) times a width of the second electronic display, the second electronic display being hingedly coupled to the first electronic display so that, when the first electronic display is parallel to and in a same plane as the second electronic display, the first electronic display and second electronic display form an enlarged electronic display which has a height which is approximately the square root of two ($\sqrt{2}$) times a width of the enlarged electronic display.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
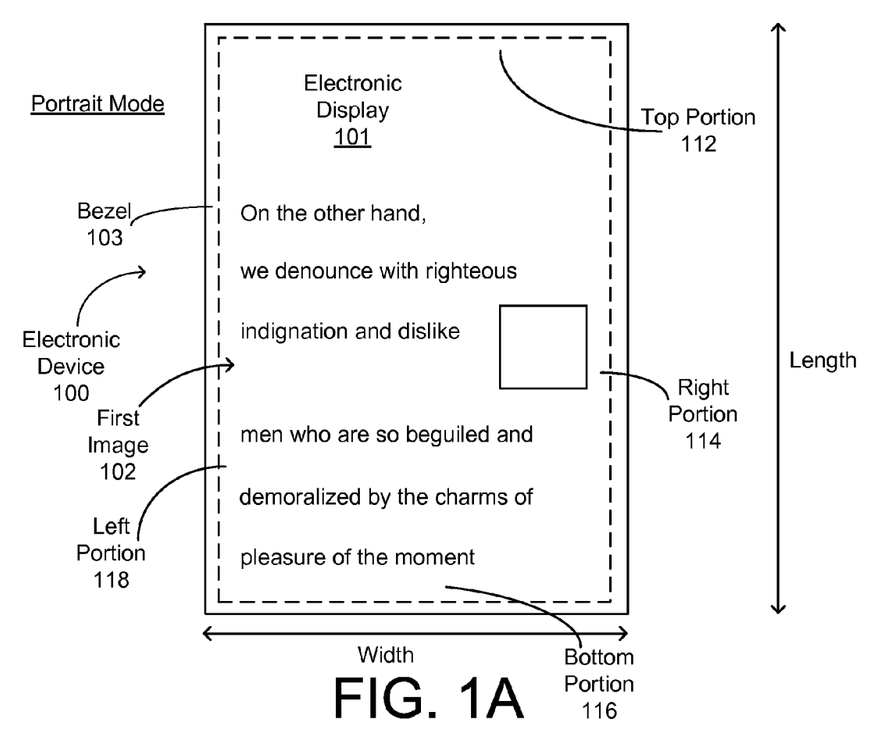
FIG. 1A is a diagram showing an electronic device with a display in a portrait mode with a first image according to an example embodiment.

FIG. 1A is a diagram showing an electronic device 100 with a display 101 in a portrait mode with a first image 102 according to an example embodiment. In this example, the first image 102 includes text ("On the other hand, we denounce with righteous indignation and dislike men who are so beguiled and demoralized by the charms of pleasure of the moment"), and a box. The images described herein may fill substantially all of the display 101. The display 101 may include, for example, a liquid crystal display (LCD), a plasma display, a light-emitting diode (LED) display, or other device capable of generating an image viewable by a human eye. The display 101 may be bordered by a bezel 103. The bezel 103 may, for example, be a portion of a housing which surrounds the display 101 and encloses processing circuitry inside the electronic device 100, such as a processor or controller, memory, and other components such as those described with reference to FIG. 4. The bezel 103 may not generate an image, and may serve to protect the display 101, and/or provide a place for a user to hold the electronic device 100 without touching the display 101.

The display 101, independent of the bezel 103, may have an aspect ratio of approximately a square root of two ($\sqrt{2}$). For example, a length of the display 101 may be the square root of two ($\sqrt{2}$) times a width of the electronic display 101, as shown in the following equation:

$$\text{Length} = \sqrt{2} \cdot \text{Width}$$

"Approximately" a square root of two (√2) may mean, for example, be 1.4142, 1.414, or 1.41; the length of the display 101 may, for example, be 1.4142, 1.414, or 1.41 times the width of the display 101.

In an example embodiment, the display 101 may have the square root of two (√2) times as many pixels along the length of the display 101 as along the width of the display 101. For example, if the display 101 is 1,000 pixels wide, the display 101 may be 1,414 pixels long.

Because the length of the display 101 is the square root of two (√2) times the width of the display 101, half of the length of the display 101 is the square root of two divided by two (√2/2) times the width of the display 101. The width may be the square root of two (√2) times half the length of the display, as shown by the following equations:

Half-Length=√2/2·Width

Width=√2·Half-Length

In an example implementation, in which the width of the display 101 is 1,000 pixels wide, half of the length of the display 101 may be 707 pixels long.

Because the width of the display 101 is the square root of two (√2) times half of the length of the display 101, or the same ratio as the full length to the width of the display 101, if the display 101 is divided widthwise, each half of the display 101 has the same aspect ratio, the square root of two (√2), as the full display 101, rotated ninety degrees (90°).

In the example shown in FIG. 1A, the display 101 may include the first image 102. While the first image 102 shown in the display 101 of FIG. 1A includes text with a box, this is merely one example, and the first image 102 may include any image capable of being displayed on an electronic screen such as the display 101.

FIG. 1A shows the electronic display 101 in a "portrait mode," in which the length of the electronic display 101 is the vertical axis, and the width of the electronic display 101 is the horizontal axis. In FIG. 1A, the first image 102 is shown being displayed while the display 101 is in the portrait mode. The electronic display 101 may also be physically rotated so it can be viewed in a "landscape mode," in which the width of the electronic display 101 is the vertical axis, and the length of the electronic display 101 is the horizontal axis.

Figure 1B:
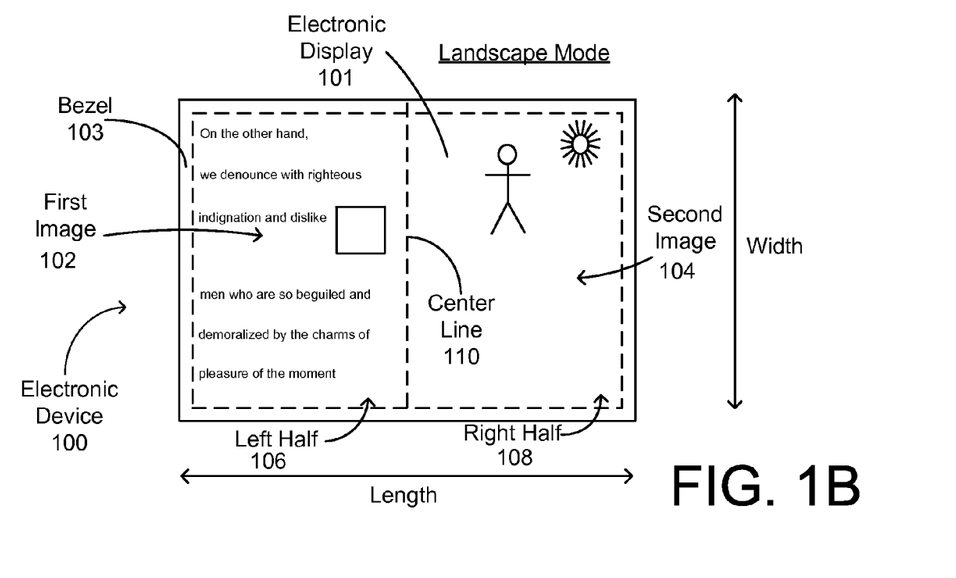
FIG. 1B is a diagram showing the electronic device of FIG. 1 with the display in a landscape mode with the first image and a second image according to an example embodiment.

FIG. 1B is a diagram showing the electronic device of FIG. 1A with the display 101 in the landscape mode with the first image 102 and a second image 104 according to an example embodiment. While the second image 104 shown in in the display 101 includes a person and sun, this is merely an example, and the second image 104 may include any image capable of being displayed on an electronic screen. For example, the first and second images 102, 104 may include successive pages of a document, such as successive pages of a portable document format (pdf) file, successive pictures in a series of photographs, or successive pages of an electronic book.

An imaginary center line segment 110 may extend through a center of the display 101, dividing the display 101 into a left half 106 and a right half 108. The geometry of the electronic display 101, including the imaginary center line segment 110, will be explained further with reference to FIG. 2.

Figure 2:
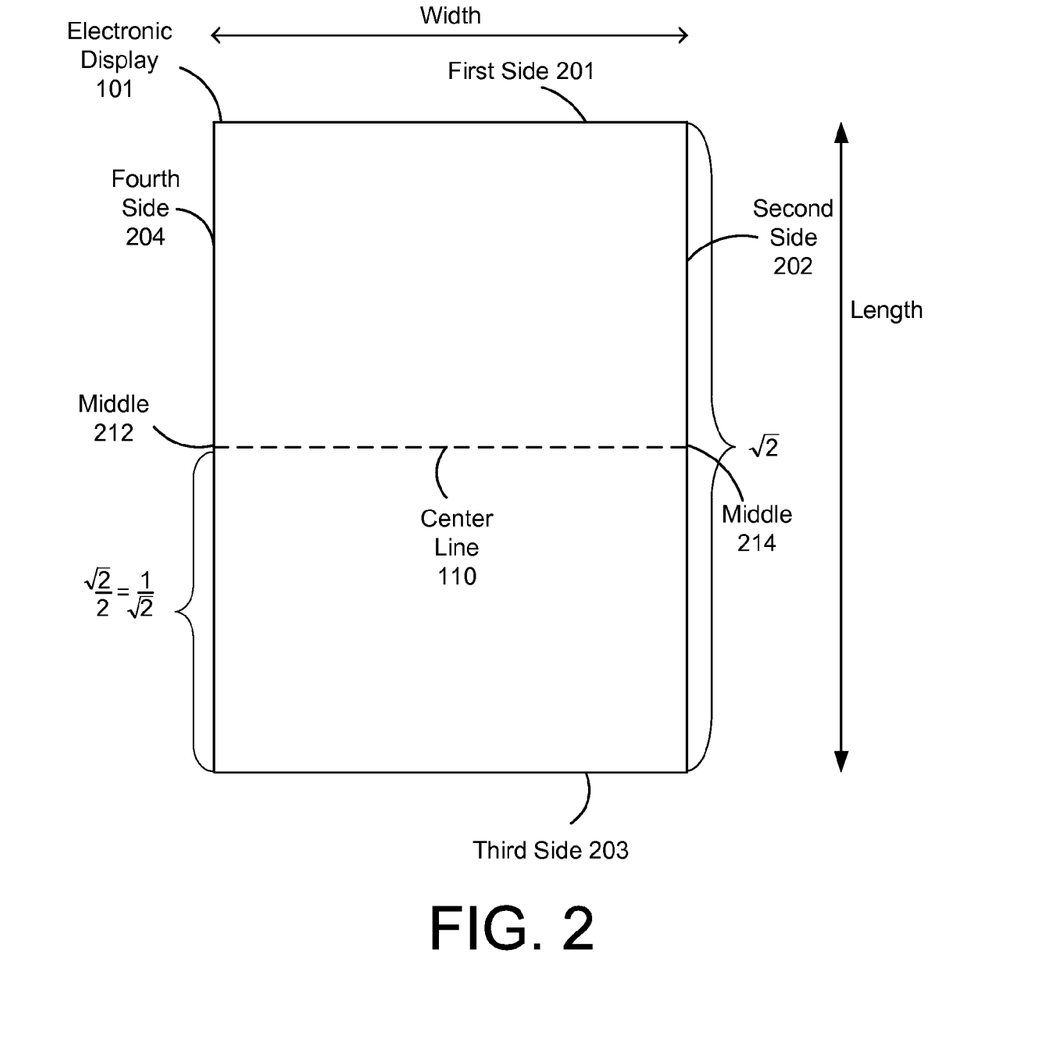
FIG. 2 is a schematic diagram showing the display of FIGS. 1A and 1B according to an example embodiment.

FIG. 2 is a schematic diagram showing the display 101 of FIGS. 1A and 1B in portrait mode according to an example embodiment. In this example, a first side 201, or "top" of the electronic display 101 when viewed in portrait mode, may extend for the width of the electronic display 101. A second side 202, or "right" side of the electronic display 101, when viewed in portrait mode, may be adjacent and perpendicular to the first side 201, and may have a length which is the square root of two (√2) times the length of the first side 201. A third side 203, or "bottom" of the electronic display 101 when viewed in portrait mode, may be parallel to the first side 201 and adjacent and perpendicular to the second side 202, and have a length which is equal to the length of the first side 201 and which is equal to the length of the second side 202 divided by the square root of two (√2). A fourth side 204, or "left" side of the electronic display 101 when viewed in portrait mode, may be parallel to the second side 202, adjacent and perpendicular to each of the first side 201 and third side 203, and have a length which is equal to the length of the second side 202 and which is the square root of two (√2) times the length of the first side 201 and the third side 203. The center line 110 may extend from a middle 212 of the fourth side 204 to a middle 214 of the second side 202.

Returning to FIG. 1B, when the display 101 is viewed in landscape mode, each of the left half 106 and the right half 108 of the display 101 may be the square root of two (√2) times as long along a vertical axis, along the width of the display 101, as along a horizontal axis, along their respective halves of the length of the display 101. For example, if the length of the display 101 were 1,414 pixels and the width of the display 101 were 1,000 pixels, then each of the left half 106 and right half 108 of the display 101 may, when viewed in the landscape mode, be 1,000 pixels long along the vertical axis and 707 pixels long along the horizontal axis.

The display 101, and/or a controller or software embodied therein, may select the second image 104 for display in response to the shifting of the display 101 from portrait mode to landscape mode. The second image 104 may, for example, be a portable document format (pdf) page which is subsequent or sequential to, or follows, the page displayed by the first image 102, a web page hidden by a browser shown in the first image 102, a window which is stacked below a window displayed by the first image 102, or an image or object selected by a user of the display 101, according to various example embodiments.

In the example shown in FIGS. 1A and 1B, when the display 101 shifts from the portrait mode shown in FIG. 1A to the landscape mode shown in FIG. 1B, the first image 102 may be rotated ninety degrees (90°), the perimeter dimensions of the image may be reduced in size (or resized) by the inverse of the square root of two (√2), and reproduced in the left half 106 (or right half 108) of the display 101. The first image 102 may have the same aspect ratio, or proportions, when displayed in the left half 106 (or right half 108) of the display 101 in landscape mode, as shown in FIG. 1B, as when displayed in the entire display 101 portrait mode, as shown in FIG. 1A.

When the electronic display 101 shifts from portrait mode to landscape mode, the first image 102 may be rotated, resized, and displayed in the left half 106 (or right half 108) of the display 101, and the second image 104 may be displayed in the opposite half 106, 108. Viewing FIG. 1A in conjunction with FIG. 2, when the display 101 is viewed in portrait mode, the first image 102 may include a top portion 112 extending along the first side 201 of the display 101, a right portion 114 extending along the second side 202 of the display 101, a bottom portion 116 extending along the third side 203 of the display 101, and a left portion 118 extending along the fourth side 204 of the display 101.

Viewing FIG. 1A in conjunction with FIG. 1B and FIG. 2, after the display 101 has been shifted into landscape mode, the top portion 112 of the first image 102 may extend along the second side 202 from an intersection between the first side 201 and the second side 202 to the middle 214 of the second side 202. The right portion 114 of the first image 102 may extend along the imaginary center line segment 110. The bottom portion 116 of the first image 102 may extend along the fourth side 204 from the middle 212 of the fourth side 204 to an intersection between the fourth side 204 and the first side 201. The left portion 118 of the first image 102 may extend along the first side 201. The first image 102 may maintain its aspect ratio in both the portrait mode and the landscape mode, but be reduced in size by a factor of the square root of two ($\sqrt{2}$) in both the length and width dimensions. The aspect ratio of the first image 102 may be maintained after the shift from the portrait mode to the landscape mode, all of the first image 102 which was displayed by the entire display 101 in the portrait mode may be displayed by the entire left half 106 (or right half 108), and all of the display 101 in the portrait mode and the left half 106 (or right half 108) in landscape mode may be utilized to display the first image 102, according to an example embodiment.

Also after the display 101 has been shifted into the landscape mode, a top portion of the second image 104 may extend along the second side 202 from the middle 214 of the second side 202 to an intersection between the second side 202 and the third side 203. A right portion of the second image 104 may extend along the third side 203 of the display 101. A bottom portion of the second image 104 may extend along the fourth side 204 of the display 101 from an intersection of the third side 203 and the fourth side 204 to the middle 212 of the fourth side 204. A left portion of the second image 104 may extend along the imaginary center line segment 110. The left portion of the second image 104 may be adjacent to the right portion 114 of the first image 104, all according to an example embodiment.

In an example embodiment, the electronic display 101 may include a tilt sensor. The tilt sensor may determine an angle at which the display 101 is held or placed relative to the surface of the earth based on the direction that the force of gravity pulls on the tilt sensor. The tilt sensor may determine whether the display 101 is being viewed from a portrait angle or a landscape angle based on a tilt of the display 101. For example, if either the first side 201 or third side 203 of the display 101 is significantly higher than its opposite side, then the tilt sensor may determine that the display 101 is being viewed from a portrait angle, with the respective side 201, 203 at the top. If either the second side 202 or fourth side 204 of the display 101 is significantly higher than its opposite side, then the tilt sensor may determine that the display 101 is being viewed from a landscape angle, with the higher side 202, 204 at the top.

In an example embodiment, the display 101 may have a linear screen resolution of at least 180 dots per inch (dpi) or an area screen resolution of at least 32,400 dots per square inch. This screen resolution of 180 dpi may allow the display 101 to rotate and resize the first image 102 without a noticeable loss of image quality; differences due to rounding may be imperceptible to a human eye. In another example embodiment, the display 101 may have a linear screen resolution of at least 240 dpi, allowing the display 101 to rotate and resize the first image 102 without a noticeable loss of image quality; differences due to rounding may be imperceptible to a human eye.

Figure 3A:
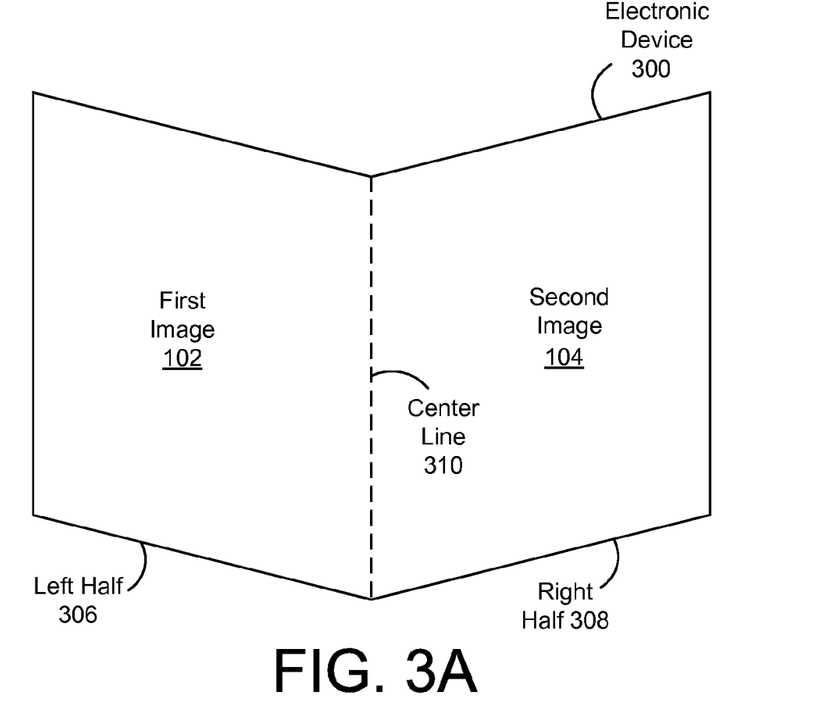
FIG. 3A is a diagram showing a folding electronic device according to an example embodiment.

FIG. 3A is a diagram showing a folding electronic device 300 according to an example embodiment. The folding electronic device 300 may include a document reader, such as a reader that allows a user to view a single page when the folding electronic device 300 is folded in half, or to read two pages side-by-side when the folding electronic device 300 is unfolded. The folding electronic display 300 may include any combination of the features of the display 101 described above. According to this example, the electronic display 300 may physically fold along a center line 310. The center line 310 may include one or more hinges or joints enabling opposite halves 306, 308 of the folding electronic display 300 to rotate or fold relative to each other.

The device 300 may comprise two primary components divided by the center line 310, which may be referred to as a left half 306 and a right half 308. Each half 306, 308 may include its own display, which may have features and properties similar to the display 101 described above. The left half 306 and right half 308 may be connected to each other by hinges, joints, or other folding means. The folding means may allow the two halves 306, 308 to rotate or fold relative to each other. The rotating or folding may enable the halves 306, 308 to rotate or move through a range of motion from the halves 306, 308 being parallel to each other with the display portions facing each other with the left half 306 on top of the right half 308, to the halves 306, 308 being perpendicular to each other, to the halves 306, 308 being parallel to each other and extending along a common plane (unfolded lengthwise), to the halves 306, 308 being perpendicular to each other, to the halves 306, 308 being parallel to each other with the display portions facing away from each other with the first half 306 below the second half 308.

The device 300, and/or a controller or software embodied therein, may be shifted from the portrait mode to the landscape mode in response to changes in the angle of connection between the halves 306, 308. For example, when the halves 306, 308 are stacked on top of each other and parallel to each other, the device 300 may display a single image, such as the first image 102, in the portrait mode in one half of the device. In this manner, a user can use the device as a single-page document reader. When the display 300 is unfolded so that the display portions of the halves 306, 308 are adjacent to each other in the same plane, or in planes close enough that the displays of both halves 306, 308 could be viewed from a single vantage point, the display 300 may display an image in each half 306, 308, such as displaying the first image 102 in the left half 306 and the second image 104 in the right half 308. In this manner, a user can use the device 300 as a two-page document reader, so that the device 300 may appear to the user as an open book, with the images 102, 104 on the respective halves 306, 308 appearing as pages on the left and right of the book. When the two halves 306, 308 are not parallel to each other, the electronic device 300 can operate either as a single page document reader or a two-page document reader.

In an example embodiment, when the two halves 306, 308 are parallel to each other and in a same plane, so that the device 300 is fully open, or when the display portions of the halves 306, 308 approach or fold toward each other, so that the display portions of the halves 306, 308 can both be viewed from a same vantage point, the device 300 may operate in a "book" mode, with each half 306, 308 displaying its own image 102, 104, as shown in FIG. 3A.

When the display portions of the halves 306, 308 fold away from each other, so that the display portion of only one of the halves 306, 308 can be seen from a single vantage point, the device 300 may exit the book mode, and enter a single page mode. In an example embodiment, if the display 300 is folded in a direction so that the display portions of the halves 306, 308 are facing away from each other, the display portion of one half 306, 308 may be turned off, so that only the other half 306, 308 displays an image(s) to a user.

Figure 3B:
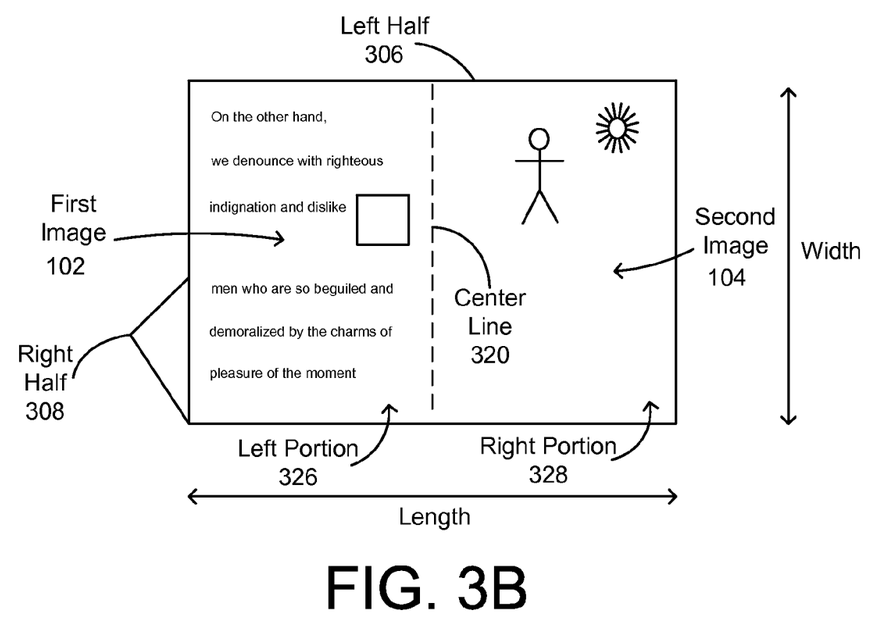
FIG. 3B is a diagram showing the folding electronic device of FIG. 3A according to an example embodiment.

FIG. 3B is a diagram showing the folding electronic device of FIG. 3A according to an example embodiment. In this example, the halves 306, 308 are approximately perpendicular to each other, or may have been rotated beyond ninety degrees (90°), so that the portions of each half 306, 308 which do not include the display are facing each other, and the display portion of the right half 308 has turned off because the halves 306, 308 have folded away from each other beyond the parallel angle described above. The left half 306 (or right half 308), which is on and/or displaying image(s), may enter a landscape mode, displaying two images, one in each of a left portion 326 and a right portion 328 of the left half 306 (or right half 308). In this example, each of these images 102, 104 may be exactly half as long and half as wide as the single image (e.g., first image 102) was in the portrait mode which displayed a single image encompassing both halves 306, 308 of the display 300, with the aspect ratio being maintained. Or, the left portion 326 of the left half 306 may display the first image 102 which was displayed by the left half 306 when both halves 306, 308 were viewable from the same vantage point (as shown in FIG. 3A), and the right portion 328 of the left half 306 may display the second image 104 which was displayed by the right half 308 when both halves 306, 308 were viewable from the same vantage point (as shown in FIG. 3A), with their sizes reduced by the ratio of the square root of two ($\sqrt{2}$).

Figure 4:
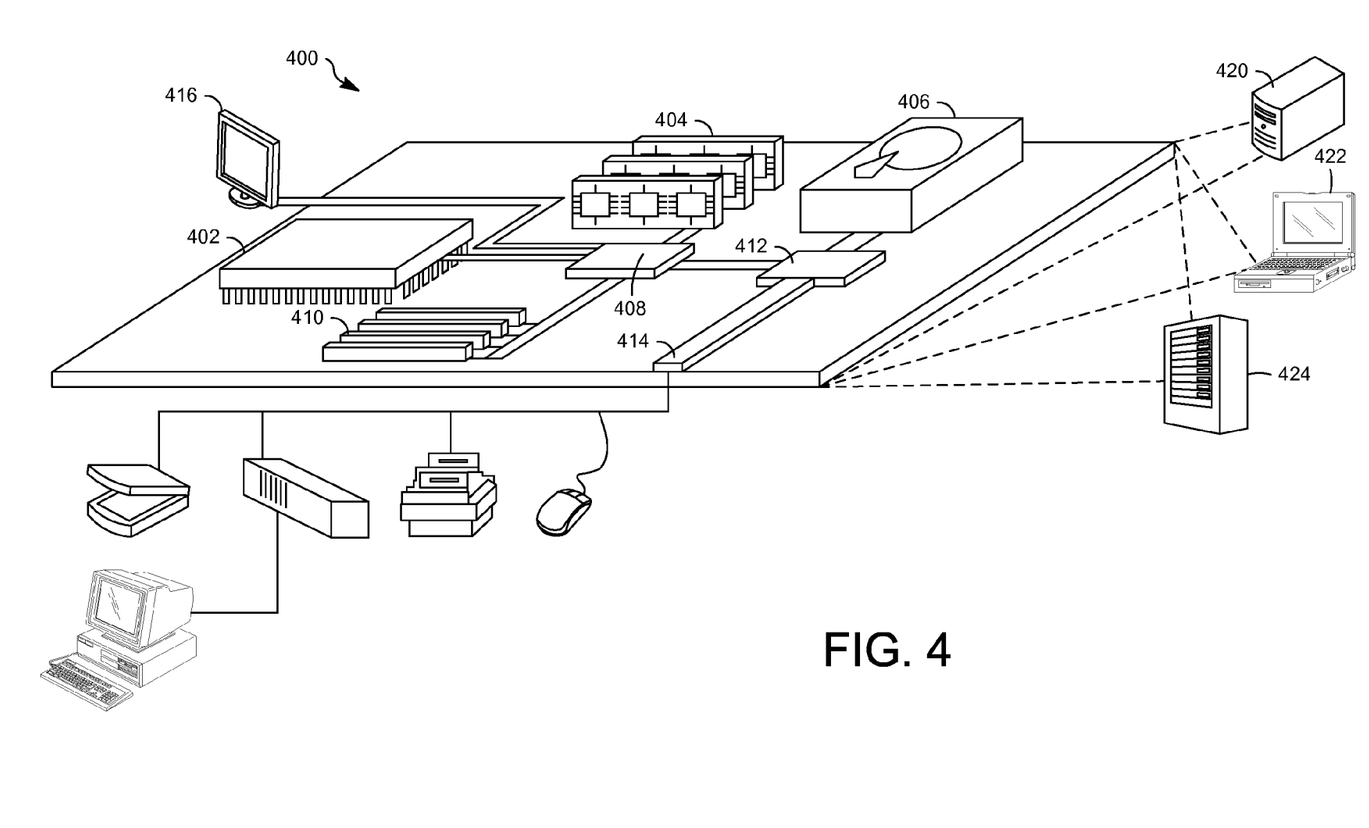
FIG. 4 shows an example of a computer device that can be used to implement the techniques described herein.

FIG. 4 shows an example of a generic computer device 400, which may include components of the electronic devices 100, 300 described above. Computing device 400 is intended to represent various forms of digital computers, such as laptops, desktops, workstations, personal digital assistants, tablet computers, electronic reading devices, and other appropriate computers.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory.

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, components from computing device 400 may be combined with other components in a mobile device (not shown), such as a laptop computer, tablet computer, or reading device. Each of such devices may contain one or more of computing device 400, and an entire system may be made up of multiple computing devices 400, communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

What is claimed is:

1. An electronic device comprising:
    a display region having a rectangular shape with a length and a width, the length being approximately a square root of two ($\sqrt{2}$) times longer than the width; and
    a controller configured to:
        display a first page in the display region when the display region is oriented in a portrait mode, the first page having a first aspect ratio defined by a first length of the first page divided by a first width of the first page,
        select, in response to an indication that the display region has been rotated from the portrait mode to a landscape mode, a second page, the second page being a successive page following the first page within a document; and
        automatically display, in response to the indication that the display region has been rotated from the portrait mode to the landscape mode, a reduced version of the first page in a left portion of the electronic display region and the second page in a right portion of the electronic display region, the reduced version of the first page having a second aspect ratio defined by a second length of the reduced version of the first page divided by a second width of the reduced version of the first page, wherein the second length is different from the first length, the second width is different from the first width, the second aspect ratio is substantially equal to the first aspect ratio, and the reduced version of the first page being rotated by ninety degrees (90°) with respect to the first page in the portrait mode.

2. The electronic device of claim 1, wherein the controller is configured to:
    display the first page in substantially all of the display region in the portrait mode; and
    automatically display the reduced version of the first page in approximately half of the display region when the display region is rotated.

3. The electronic device of claim 1, wherein the first length is approximately equal to the second length multiplied by approximately $\sqrt{2}$.

4. The electronic device of claim 1, further comprising:
    a tilt sensor configured to determine whether the electronic display is being viewed from a portrait angle or a landscape angle based on a tilt of the electronic device,
    wherein the controller is configured to shift between displaying the first page in the portrait mode and the reduced version of the first page and the second page in the landscape mode.

5. The electronic device of claim 1, wherein the display region has a linear resolution of at least 180 dots per inch (dpi).

6. The electronic device of claim 1, wherein the display region has a linear resolution of at least 240 dots per inch (dpi).

7. The electronic device of claim 1, wherein the display region has a screen resolution that allows the display region to rotate and resize images by a scale of approximately the square root of two ($\sqrt{2}$) with differences in rounding being imperceptible to a human eye.

8. An electronic device comprising:
    a housing;
    an electronic display coupled to the housing and having a rectangular shape, the electronic display having a length which is approximately a square root of two ($\sqrt{2}$) times a width of the electronic display and having a screen resolution that allows the electronic display to rotate and resize images by a scale of approximately the square root of two ($\sqrt{2}$) with differences in rounding being imperceptible to a human eye; and
    a controller configured to control an image displayed by the electronic display, the controller being configured to shift the image between:
        a portrait mode including a first page, the first page occupying all of the electronic display; and
        a landscape mode including a reduced version of the first page occupying a left half or a right half of the electronic display and a second page occupying an opposite half of the electronic display, the second page being a successive page following the first page within a document, wherein all of the first page which was displayed in the portrait mode is displayed in the reduced version in all of the left half or the right half of the electronic display and the reduced version of the first page maintains a same aspect ratio in the landscape mode as in the portrait mode.

9. The electronic device of claim 8, wherein the first page maintains its aspect ratio in both the portrait mode and the landscape mode.

10. The electronic device of claim 8, wherein a size of the first page is reduced to the reduced version by a scale of approximately the square root of two ($\sqrt{2}$) while maintaining its aspect ratio.

11. The electronic device of claim 8, further comprising:
    a tilt sensor configured to determine whether the electronic display is being viewed from a portrait angle or a landscape angle based on a tilt of the electronic device,
    wherein the controller is configured to shift between displaying the first page in the portrait mode and the reduced version of the first page and the second page in the landscape mode based on the determination of whether the electronic display is being viewed from the portrait angle or the landscape angle.

12. The electronic device of claim 8, wherein the electronic display has a linear resolution of at least 180 dots per inch (dpi).

13. The electronic device of claim 8, wherein the electronic display has a linear resolution of at least 240 dots per inch (dpi).

14. A non-transitory computer-readable storage medium comprising instructions stored thereon that, when executed by a controller, are configured to cause an electronic device to:
- display a first page in a display region of the electronic device when the display region is oriented in a portrait mode, the first page having a first aspect ratio defined by a first length of the first page divided by a first width of the first page,
- select, in response to an indication that the display region has been rotated from the portrait mode to a landscape mode, a second page, the second page being a successive page following the first page within a document; and
- automatically display, in response to the indication that the display region has been rotated from the portrait mode to the landscape mode, a reduced version of the first page in a left portion of the electronic display region and the second page in a right portion of the display region, the reduced version of the first page having a second aspect ratio defined by a second length of the reduced version of the first page divided by a second width of the reduced version of the first page, wherein the second length is different from the first length, the second width is different from the first width, the second aspect ratio is substantially equal to the first aspect ratio, and the reduced version of the first page being rotated by ninety degrees (90°) with respect to the first page in the portrait mode.

15. The non-transitory computer-readable storage medium of claim 14, wherein the display region has a rectangular shape with a length and a width, the length being approximately a square root of two ($\sqrt{2}$) times longer than the width.

16. The non-transitory computer-readable storage medium of claim 14, wherein the instructions are configured to cause the electronic device to:
- display the first page in substantially all of the display region in the portrait mode; and
- automatically display the reduced version of the first page in approximately half of the display region when the display region is rotated.

* * * * *